US012610137B2

(12) United States Patent
Tozawa et al.

(10) Patent No.: US 12,610,137 B2
(45) Date of Patent: Apr. 21, 2026

(54) IMAGE CAPTURING APPARATUS AND CONTROL METHOD THEREOF, AND STORAGE MEDIUM

(71) Applicant: CANON KABUSHIKI KAISHA, Tokyo (JP)

(72) Inventors: Shohei Tozawa, Kanagawa (JP); Daisuke Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 18/775,628

(22) Filed: Jul. 17, 2024

(65) Prior Publication Data

US 2024/0373127 A1       Nov. 7, 2024

Related U.S. Application Data

(63) Continuation of application No. PCT/JP2022/048565, filed on Dec. 28, 2022.

(30) Foreign Application Priority Data

Jan. 31, 2022       (JP) ................................. 2022-013585

(51) Int. Cl.
*H04N 23/667* (2023.01)
*H04N 5/77* (2006.01)
(Continued)

(52) U.S. Cl.
CPC ........... *H04N 23/667* (2023.01); *H04N 5/772* (2013.01); *H04N 23/632* (2023.01); (Continued)

(58) Field of Classification Search
CPC .. H04N 23/631; H04N 23/632; H04N 23/667; H04N 23/681; H04N 23/6811; (Continued)

(56) References Cited

U.S. PATENT DOCUMENTS

| | | | | |
|---|---|---|---|---|
| 2013/0147979 A1* | 6/2013 | McMahon | ............. | H04N 25/44 |
| | | | | 348/218.1 |
| 2016/0057332 A1* | 2/2016 | Ciurea | ................... | H04N 5/265 |
| | | | | 348/218.1 |
| 2019/0342485 A1* | 11/2019 | Lee | ........................ | H04N 23/81 |

FOREIGN PATENT DOCUMENTS

| | | |
|---|---|---|
| JP | 2014171146 A | 9/2014 |
| JP | 2015128253 A | 7/2015 |

(Continued)

OTHER PUBLICATIONS

Foreign Patent Documents #2, 5, and 6 were cited in the International Search Report dated Apr. 4, 2023, of International Application No. PCT/JP2022/048565, which is enclosed with a partial translation.

*Primary Examiner* — Daniel M Pasiewicz

(74) *Attorney, Agent, or Firm* — Cowan, Liebowitz & Latman, P.C.

(57) ABSTRACT

An image capturing apparatus comprises an image sensor; and a control unit that, in a case where a first shooting mode is set, controls to perform shooting a plurality of times with the image sensor while changing exposure to obtain a plurality of images, and in a case where a second shooting mode different from the first shooting mode is set, controls to amplify an image signal obtained by performing shooting once with the image sensor by a plurality of different gains within the image sensor to obtain a plurality of images.

13 Claims, 14 Drawing Sheets

(51) Int. Cl.

|  |  |
|---|---|
| *H04N 23/63* | (2023.01) |
| *H04N 23/68* | (2023.01) |
| *H04N 23/73* | (2023.01) |
| *H04N 23/741* | (2023.01) |
| *H04N 23/743* | (2023.01) |
| *H04N 23/76* | (2023.01) |

(52) U.S. Cl.
CPC ....... *H04N 23/6811* (2023.01); *H04N 23/741* (2023.01); *H04N 23/743* (2023.01); *H04N 23/73* (2023.01); *H04N 23/76* (2023.01)

(58) Field of Classification Search
CPC .... H04N 23/741; H04N 23/743; H04N 23/73; H04N 23/76; H04N 25/58; H04N 25/583; H04N 25/587; H04N 25/589
See application file for complete search history.

(56) References Cited

FOREIGN PATENT DOCUMENTS

| JP | 2017534230 | A | 11/2017 |
|---|---|---|---|
| JP | 2021192498 | A | 12/2021 |
| WO | 2015125769 | A1 | 8/2015 |
| WO | 2016073528 | A2 | 5/2016 |

\* cited by examiner

300

F I G. 4

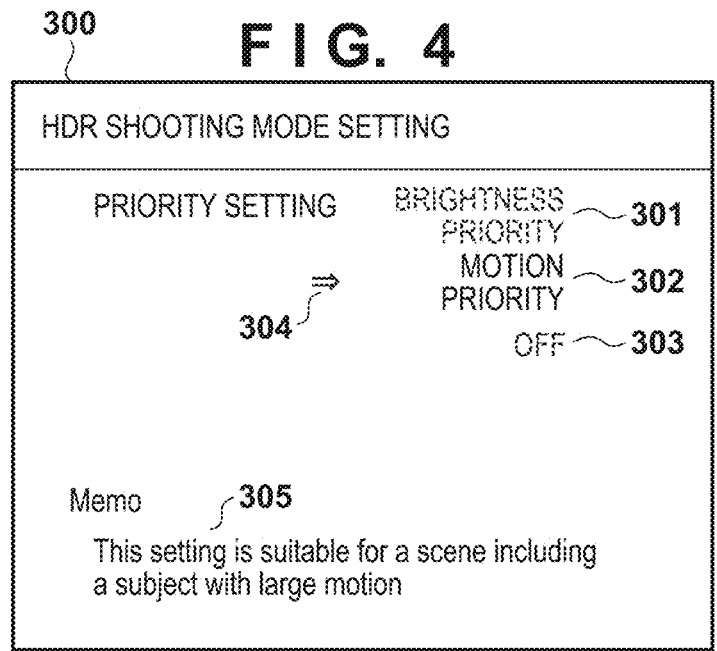

HDR SHOOTING MODE SETTING

PRIORITY SETTING     BRIGHTNESS PRIORITY ~301

MOTION PRIORITY ~302

304 ⇒

OFF ~303

Memo 305

This setting is suitable for a scene including a subject with large motion

F I G. 5

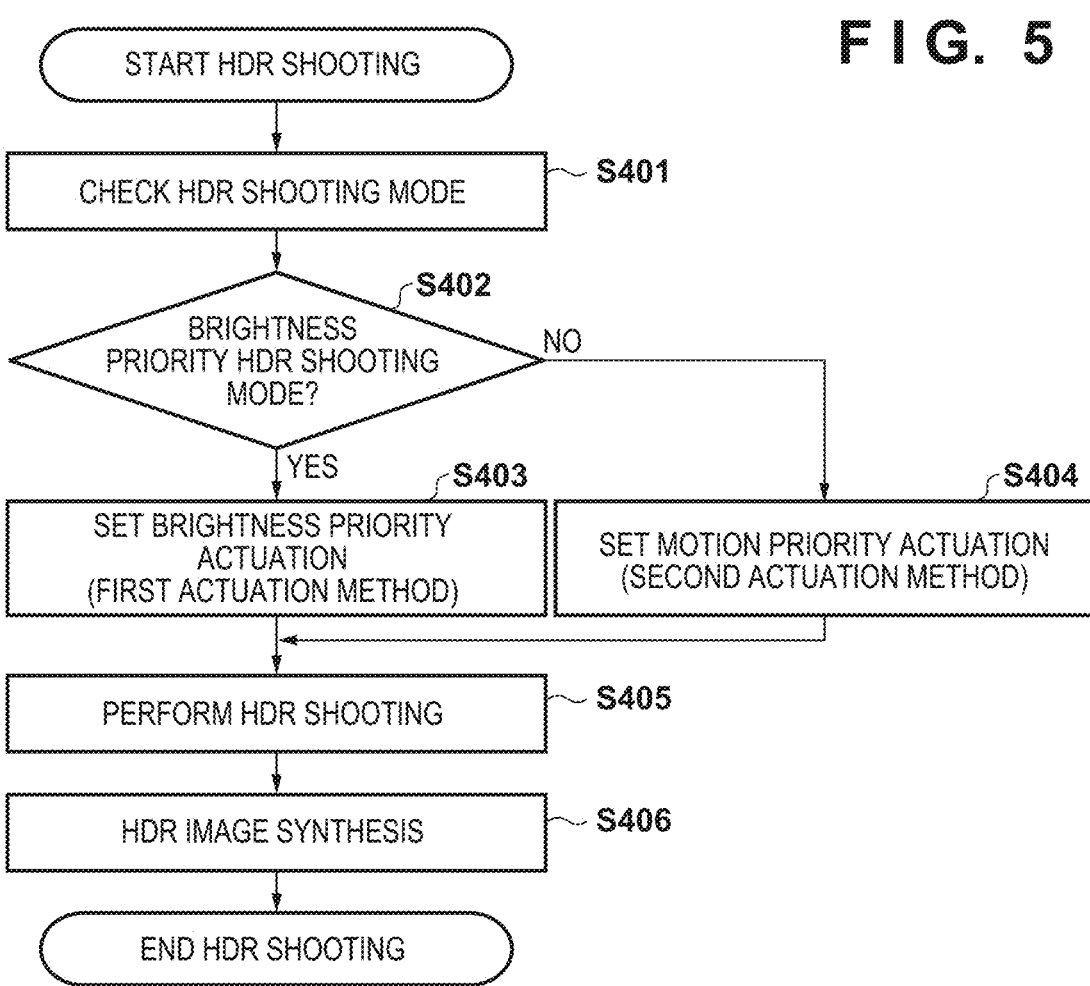

START HDR SHOOTING

CHECK HDR SHOOTING MODE — S401

BRIGHTNESS PRIORITY HDR SHOOTING MODE? — S402

NO

YES

SET BRIGHTNESS PRIORITY ACTUATION (FIRST ACTUATION METHOD) — S403

SET MOTION PRIORITY ACTUATION (SECOND ACTUATION METHOD) — S404

PERFORM HDR SHOOTING — S405

HDR IMAGE SYNTHESIS — S406

END HDR SHOOTING

F I G. 7
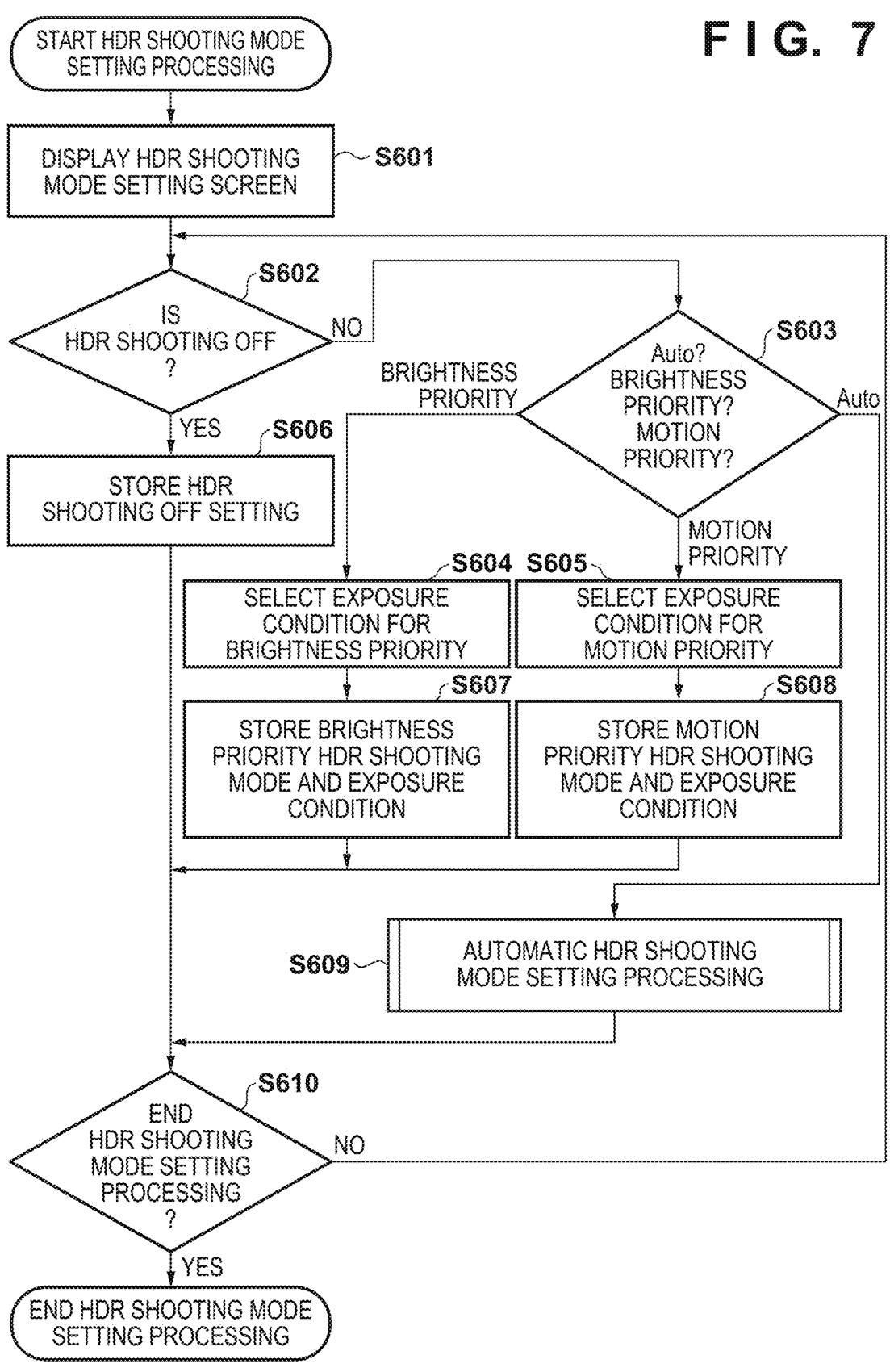

800

F I G.  8

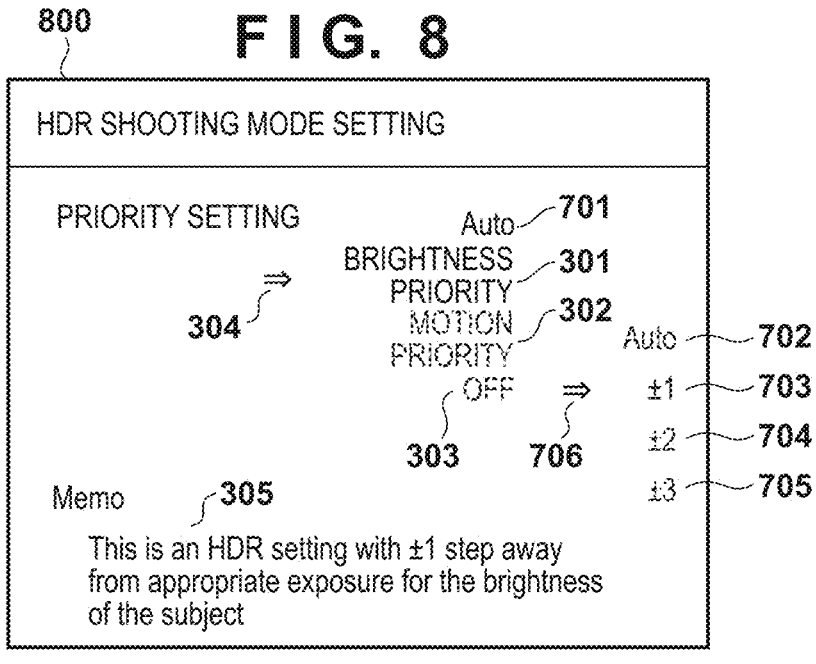

HDR SHOOTING MODE SETTING

PRIORITY SETTING                         Auto—701
                              BRIGHTNESS —301
                              PRIORITY
                  ⇒           MOTION —302
         304                  PRIORITY              Auto—702
                                                    ±1—703
                                    OFF    ⇒        ±2—704
                                   303     706      ±3—705

Memo    —305

This is an HDR setting with ±1 step away
from appropriate exposure for the brightness
of the subject

F I G.  9

START AUTOMATIC HDR SHOOTING MODE
SETTING PROCESSING

PERFORM PRE-SHOOTING, CALCULATE EVALUATION VALUES        —S801

REFER TO HDR SHOOTING MODE TABLES
ACCORDING TO EVALUATION VALUES        —S802

STORE HDR SHOOTING MODE IN STORAGE UNIT        —S803

S804

NO          END?

YES

END AUTOMATIC HDR SHOOTING MODE
SETTING PROCESSING

F I G. 10A

| No. | SUBJECT | | | HDR SHOOTING MODE | COMBINATION OF ISO AND Tv | | |
|-----|---------|---|---|-------------------|---------------------------|---|---|
| | BRIGHTNESS DIFFERENCE | AMOUNT OF MOTION | BRIGHTNESS | | FIRST IMAGE | SECOND IMAGE | THIRD IMAGE |
| A1 | LARGE | LARGE | LARGE | MOTION PRIORITY | 800-100 | — | — |
| A2 | | LARGE | SMALL | MOTION PRIORITY | 3200-400 | — | — |
| B1 | | MIDDLE | LARGE | HYBRID | 800(APPROPRIATE) | 100-6400 | — |
| B2 | | MIDDLE | SMALL | HYBRID | 3200(APPROPRIATE) | 400-25600 | — |
| C1 | | SMALL | LARGE | BRIGHTNESS PRIORITY | 800(APPROPRIATE) | Tv-3 | Tv+3 |
| C2 | | SMALL | SMALL | BRIGHTNESS PRIORITY | 3200(APPROPRIATE) | Tv-3 | Tv+3 |
| D1 | MEDIUM | LARGE | LARGE | MOTION PRIORITY | 800-200 | — | — |
| D2 | | LARGE | SMALL | MOTION PRIORITY | 3200-800 | — | — |
| E1 | | MIDDLE | LARGE | HYBRID | 800(APPROPRIATE) | 200-3200 | — |
| E2 | | MIDDLE | SMALL | HYBRID | 3200(APPROPRIATE) | 800-12800 | — |
| F1 | | SMALL | LARGE | BRIGHTNESS PRIORITY | 800(APPROPRIATE) | Tv-3 | Tv+3 |
| F2 | | SMALL | SMALL | BRIGHTNESS PRIORITY | 3200(APPROPRIATE) | Tv-3 | Tv+3 |
| G1 | SMALL | LARGE | LARGE | MOTION PRIORITY | 800-400 | — | — |
| G2 | | LARGE | SMALL | MOTION PRIORITY | 3200-1600 | — | — |
| H1 | | MIDDLE | LARGE | HYBRID | 800(APPROPRIATE) | 400-1600 | — |
| H2 | | MIDDLE | SMALL | HYBRID | 3200(APPROPRIATE) | 1600-6400 | — |
| I1 | | SMALL | LARGE | BRIGHTNESS PRIORITY | 800(APPROPRIATE) | Tv-3 | Tv+3 |
| I2 | | SMALL | SMALL | BRIGHTNESS PRIORITY | 3200(APPROPRIATE) | Tv-3 | Tv+3 |

901 902 903 905

F I G. 10B

| No. | BRIGHTNESS DIFFERENCE | AMOUNT OF MOTION | BRIGHTNESS | HDR SHOOTING MODE | FIRST IMAGE | SECOND IMAGE | THIRD IMAGE |
|---|---|---|---|---|---|---|---|
| A1 | LARGE | LARGE | LARGE | MOTION PRIORITY | 800-100 | — | — |
| A2 | | LARGE | SMALL | MOTION PRIORITY | 3200-400 | — | — |
| B1 | | MIDDLE | LARGE | HYBRID | 800(APPROPRIATE) | 100-6400 | — |
| B2 | | MIDDLE | SMALL | HYBRID | 3200(APPROPRIATE) | 400-25600 | — |
| C1 | | SMALL | LARGE | BRIGHTNESS PRIORITY | 800(APPROPRIATE) | Av+3 | Av-3 |
| C2 | | SMALL | SMALL | BRIGHTNESS PRIORITY | 3200(APPROPRIATE) | Av+3 | Av-3 |
| D1 | MEDIUM | LARGE | LARGE | MOTION PRIORITY | 800-200 | — | — |
| D2 | | LARGE | SMALL | MOTION PRIORITY | 3200-800 | — | — |
| E1 | | MIDDLE | LARGE | HYBRID | 800(APPROPRIATE) | 200-3200 | — |
| E2 | | MIDDLE | SMALL | HYBRID | 3200(APPROPRIATE) | 800-12800 | — |
| F1 | | SMALL | LARGE | BRIGHTNESS PRIORITY | 800(APPROPRIATE) | Av+3 | Av-3 |
| F2 | | SMALL | SMALL | BRIGHTNESS PRIORITY | 3200(APPROPRIATE) | Av+3 | Av-3 |
| G1 | SMALL | LARGE | LARGE | MOTION PRIORITY | 800-400 | — | — |
| G2 | | LARGE | SMALL | MOTION PRIORITY | 3200-1600 | — | — |
| H1 | | MIDDLE | LARGE | HYBRID | 800(APPROPRIATE) | 400-1600 | — |
| H2 | | MIDDLE | SMALL | HYBRID | 3200(APPROPRIATE) | 1600-6400 | — |
| I1 | | SMALL | LARGE | BRIGHTNESS PRIORITY | 800(APPROPRIATE) | Av+3 | Av-3 |
| I2 | | SMALL | SMALL | BRIGHTNESS PRIORITY | 3200(APPROPRIATE) | Av+3 | Av-3 |

SUBJECT    COMBINATION OF ISO AND Av 901 902 903 906

F I G. 11
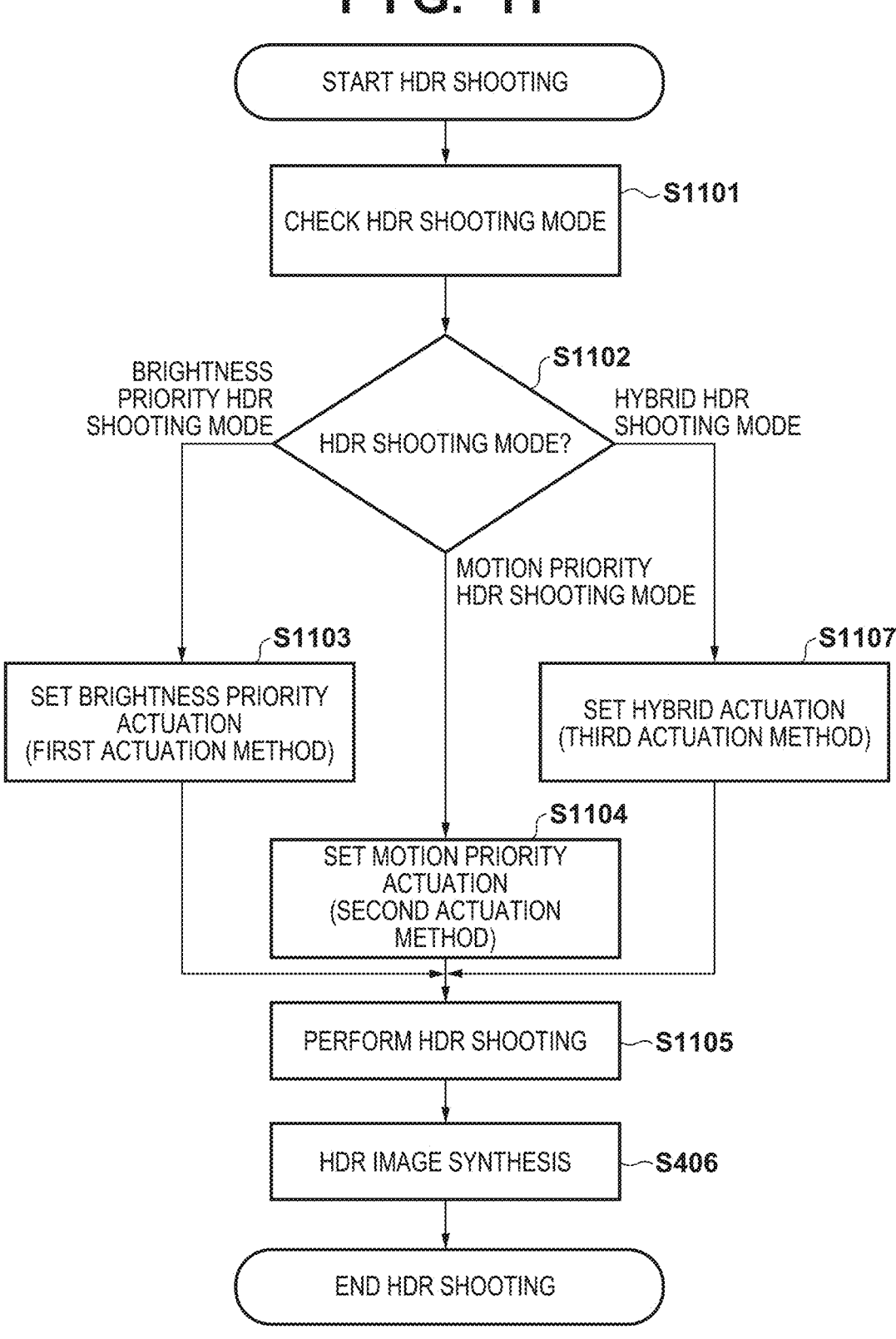

F I G. 12
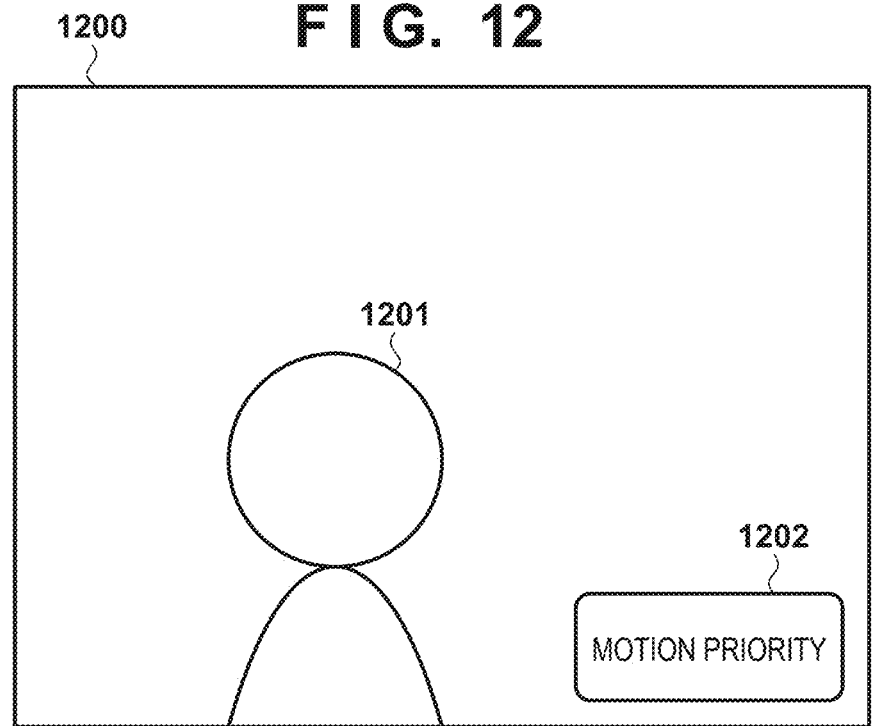

F I G. 14
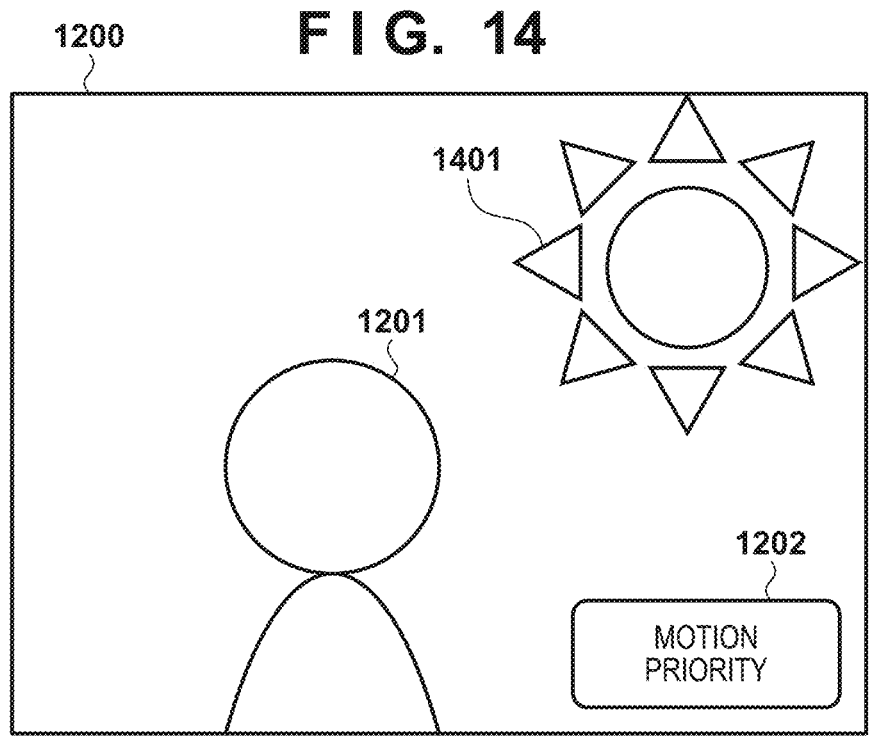
F I G. 15
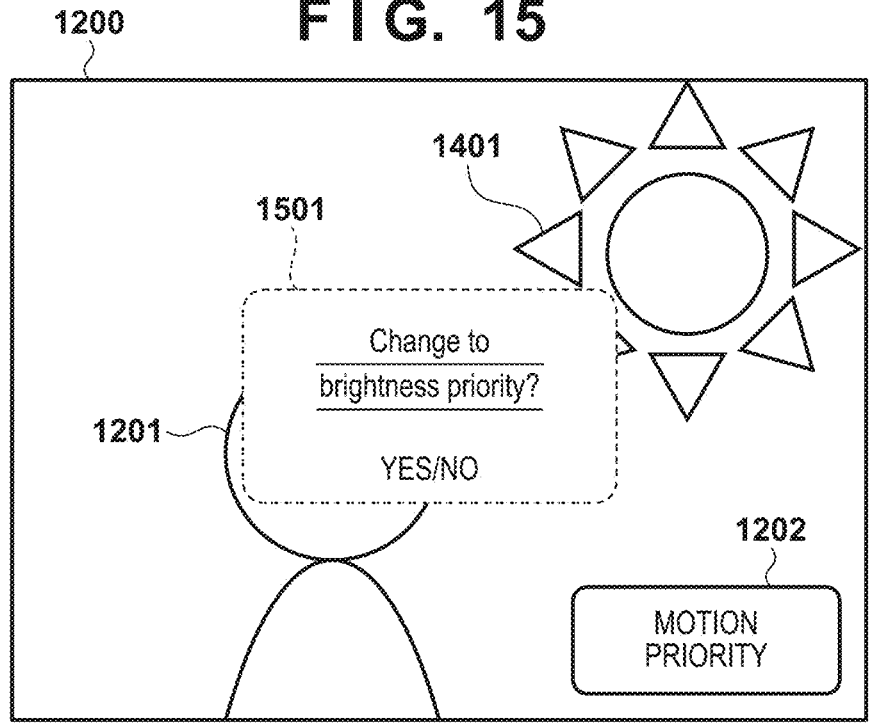

F I G. 16
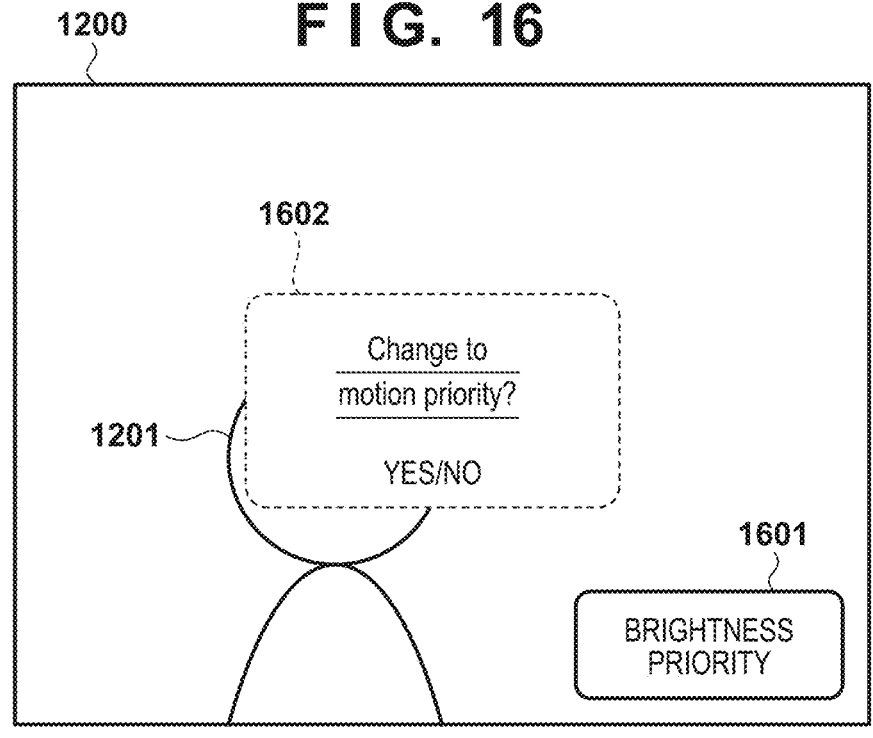

IMAGE CAPTURING APPARATUS AND CONTROL METHOD THEREOF, AND STORAGE MEDIUM

CROSS-REFERENCE TO RELATED APPLICATIONS

This application is a Continuation of International Patent Application No. PCT/JP2022/048565, filed Dec. 28, 2022, which claims the benefit of Japanese Patent Application No. 2022-013585, filed Jan. 31, 2022, both of which are hereby incorporated by reference herein in their entirety.

BACKGROUND OF THE INVENTION

Field of the Invention

The present invention relates to an image capturing apparatus and control method thereof, and storage medium and, more specifically to, a technique for generating a high-dynamic range image.

Background Art

Conventionally, techniques have been proposed to expand the dynamic range with respect to tone using image sensors such as CCD image sensors and CMOS image sensors used in general digital cameras.

In the image capturing apparatus of Japanese Patent Laid-Open No. 2015-128253, a technique is disclosed in which a signal from the same pixel is applied with a plurality of different amplification gains and read out simultaneously, and the obtained signals are combined through signal processing to expand the dynamic range. Furthermore, Japanese Patent Laid-Open No. 2014-171146 discloses a technique that expands the dynamic range by performing a plurality of shooting wherein the number of shots are changed depending on the state of a detected subject, a shooting mode, etc., and combining obtained images through signal processing.

If shooting is performed using the method disclosed in Japanese Patent Laid-Open No. 2015-128253 while increasing the difference in amplification gain in order to further expand the dynamic range, blocked up shadows of pixels resulting from an image signal below the specific output level, and blown out highlights of pixels resulting from an image signal exceeding a predetermined output level, are less likely to occur. On the other hand, the tone of pixels in intermediate output levels may be lost.

Furthermore, if the number of shots is increased in the method disclosed in Japanese Patent Laid-Open No. 2014-171146 in order to further expand the dynamic range, an unnatural composite image may be generated when the subject is moving.

SUMMARY OF THE INVENTION

The present invention has been made in consideration of the above problems, and it is an object of the present invention to adaptively generate a high-quality image with a wider dynamic range even in a case where the difference in brightness and the amount of movement of a subject is large.

According to the present invention, provided is an image capturing apparatus comprising: an image sensor; and a control unit that, in a case where a first shooting mode is set, controls to perform shooting a plurality of times with the image sensor while changing exposure to obtain a plurality of images, and in a case where a second shooting mode different from the first shooting mode is set, controls to amplify an image signal obtained by performing shooting once with the image sensor by a plurality of different gains within the image sensor to obtain a plurality of images.

Further, according to the present invention, provided is a control method of an image capturing apparatus comprising: setting to either of a first shooting mode in which shooting is performed a plurality of times with an image sensor while changing exposure to obtain a plurality of images, or a second shooting mode different from the first shooting mode in which an image signal obtained by performing shooting once with the image sensor is amplified by a plurality of different gains within the image sensor to obtain a plurality of images.

Furthermore, according to the present invention, provided is a non-transitory computer-readable storage medium, the storage medium storing a program that is executable by the computer, wherein the program includes program code for causing the computer to perform a control method of an image capturing apparatus comprising: setting to either of a first shooting mode in which shooting is performed a plurality of times with an image sensor while changing exposure to obtain a plurality of images, or a second shooting mode different from the first shooting mode in which an image signal obtained by performing shooting once with the image sensor is amplified by a plurality of different gains within the image sensor to obtain a plurality of images.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a diagram illustrating an example of user interface display according to the first embodiment.

FIG. 5 is a flowchart of HDR shooting processing according to the first embodiment.

FIG. 7 is a flowchart of HDR shooting mode setting processing according to the second embodiment.

FIG. 8 is a diagram illustrating an example of user interface display according to the second embodiment.

FIG. 9 is a flowchart of automatic HDR shooting mode setting processing according to the second embodiment.

FIG. 10A is a diagram illustrating an example of an HDR shooting mode table according to the second embodiment.

FIG. 10B is a diagram illustrating another example of the HDR shooting mode table according to the second embodiment.

FIG. 11 is a flowchart of HDR shooting processing according to the second embodiment.

FIG. 12 is a diagram illustrating an example of user interface display according to a third embodiment.

3

Figure 13:
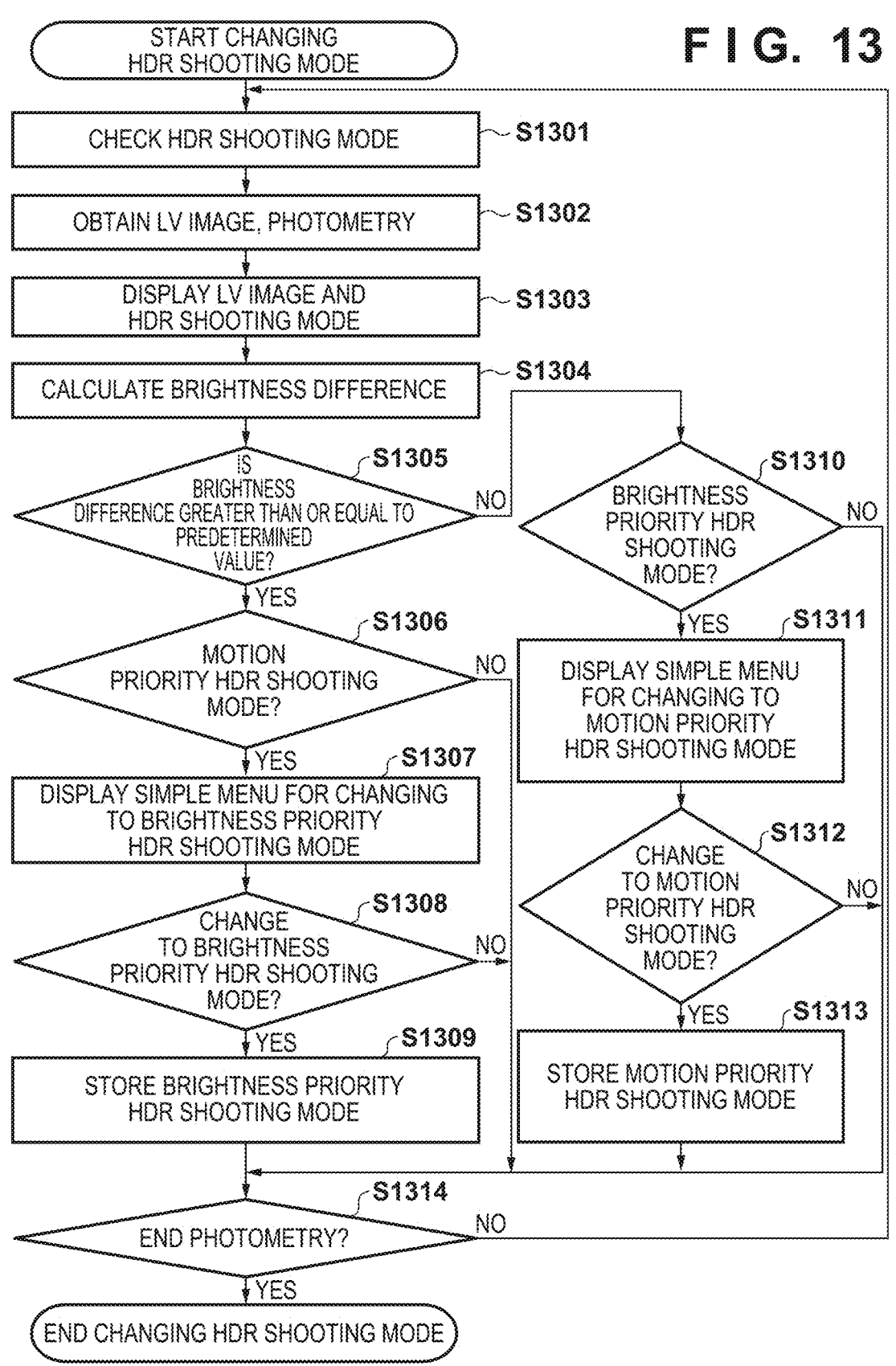

FIG. 13 is a flowchart of HDR shooting mode change processing according to the third embodiment.

FIG. 14 is a diagram illustrating an example of user interface display according to the third embodiment.

FIG. 15 is a diagram illustrating an example of user interface display according to the third embodiment.

FIG. 16 is a diagram illustrating an example of user interface display according to the third embodiment.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Configuration of Image Capturing Apparatus

Figure 1:
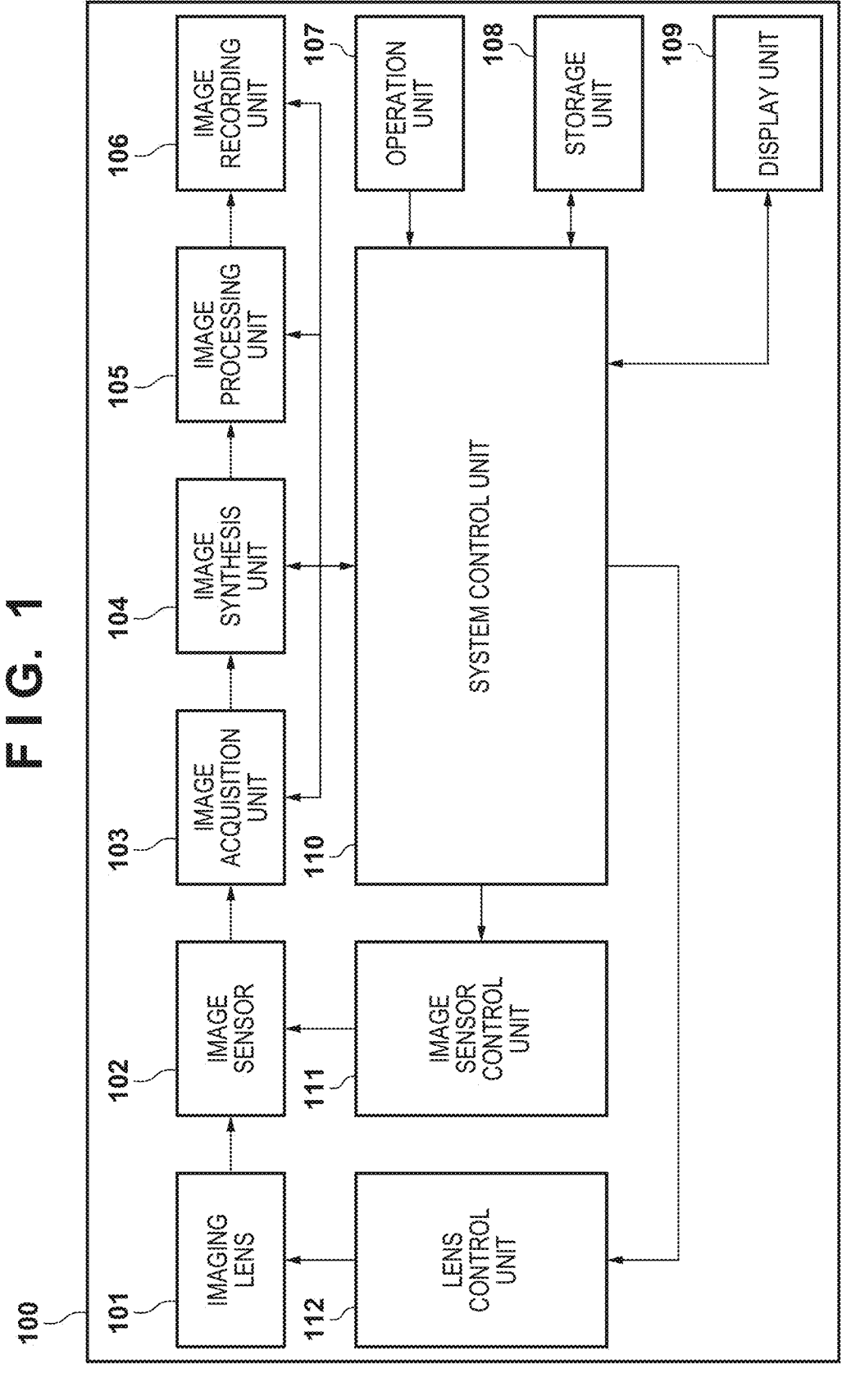
FIG. 1 is a block diagram illustrating a schematic configuration of an image capturing apparatus according to a first embodiment of the present invention.

FIG. 1 is a block diagram illustrating a schematic configuration of an image capturing apparatus 100 according to a first embodiment of the present invention. Note that the image capturing apparatus 100 may be any electronic device that has a camera function; for example, it may be a camera such as a digital camera and a digital video camera, a mobile phone with a camera, a computer with a camera, a game console, and so forth.

In FIG. 1, an imaging lens 101 is an interchangeable lens unit that can be attached to the main body of the image capturing apparatus 100, or a lens unit that is built into the main body, and includes a plurality of lenses such as a focus lens and a zoom lens, and a diaphragm, etc.

An image sensor 102 is composed of a CMOS image sensor, a CCD image sensor, etc., each having a plurality of pixels, and each pixel performs photoelectric conversion on an optical image of a subject formed by the imaging lens 101, and generates electrical charges according to the amount of incident light. Although the details will be described later, the image sensor 102 of this embodiment can be actuated by an actuation method in which a single gain is applied to a voltage signal corresponding to the charges generated in each pixel to output one image signal, and by an actuation method in which a plurality of image signals are output by multiplying the charges by a plurality of different gains.

An image acquisition unit 103 acquires an image signal output from the image sensor 102, temporarily holds the acquired image signal, and performs photometry using the acquired image signal.

An image synthesis unit 104 generates an HDR (high dynamic range) image from an image signal based on the output of the image sensor 102 that is temporarily held in the image acquisition unit 103 using a known synthesis method. For example, there is a synthesis method of using an image signal with a high gain applied or an image signal obtained by shooting with overexposure for a low-luminance image part below a predetermined signal level, and using an image signal with a low gain applied or an image signal obtained by shooting with underexposure for a high-luminance image part that exceeds a predetermined signal level. Note that it is preferable that random noise in the dark areas is suppressed in the normal image used as the signal for the dark areas of the combined image. Furthermore, in a case where HDR synthesis is not performed, the image signal held in the image acquisition unit 103 is output as is.

An image processing unit 105 performs various signal processing such as gamma processing, color signal processing, and exposure correction processing on the image signal output from the image synthesis unit 104, and outputs a processed image signal.

An image recording unit 106 records the image signal processed by the image processing unit 105 on a storage device or a storage medium. As the storage device or storage medium, for example, a memory device that can be attached to the image capturing apparatus 100 may be used.

An operation unit 107 includes operation members such as a release button, a mode switching dial, a zoom control lever, and a touch panel. By operating the operation unit 107, the user can input various instructions to the image capturing apparatus 100. User input via the operation unit 107 is notified to the system control unit 110. Note that by operating the operation unit 107, the user can set an HDR shooting mode, which will be described later, to the image capturing apparatus 100, and this process will be described later with reference to FIGS. 3 and 4.

A storage unit 108 is a storage unit that stores the contents of instructions given by the user to the image capturing apparatus 100, and is composed of a nonvolatile memory that can be electrically erased and recorded.

A display unit 109 is for displaying shot images, information at the time of shooting, and a user interface for operation by the operation unit 107, and is composed of, for example, a TFT-LCD. Furthermore, by providing a touch panel on the front surface of the display unit 109, the touch panel forms a part of the operation unit 107 together with the display unit 109. Alternatively, a part of the operation unit 107 may be configured by using an EVF or the like having a line-of-sight input function and detecting line-of-sight.

A system control unit 110 controls an image sensor control unit 111 and a lens control unit 112 based on image signals held in the image acquisition unit 103 and photometry results and input content by the user via the operation unit 107.

The image sensor control unit 111 performs actuation control of the image sensor 102 according to a control signal from the system control unit 110.

The lens control unit 112 performs actuation control of the imaging lens 101 according to a control signal from the system control unit 110.

Configuration of Image Sensor

Next, the configuration of the image sensor 102 will be explained.

Figure 2:
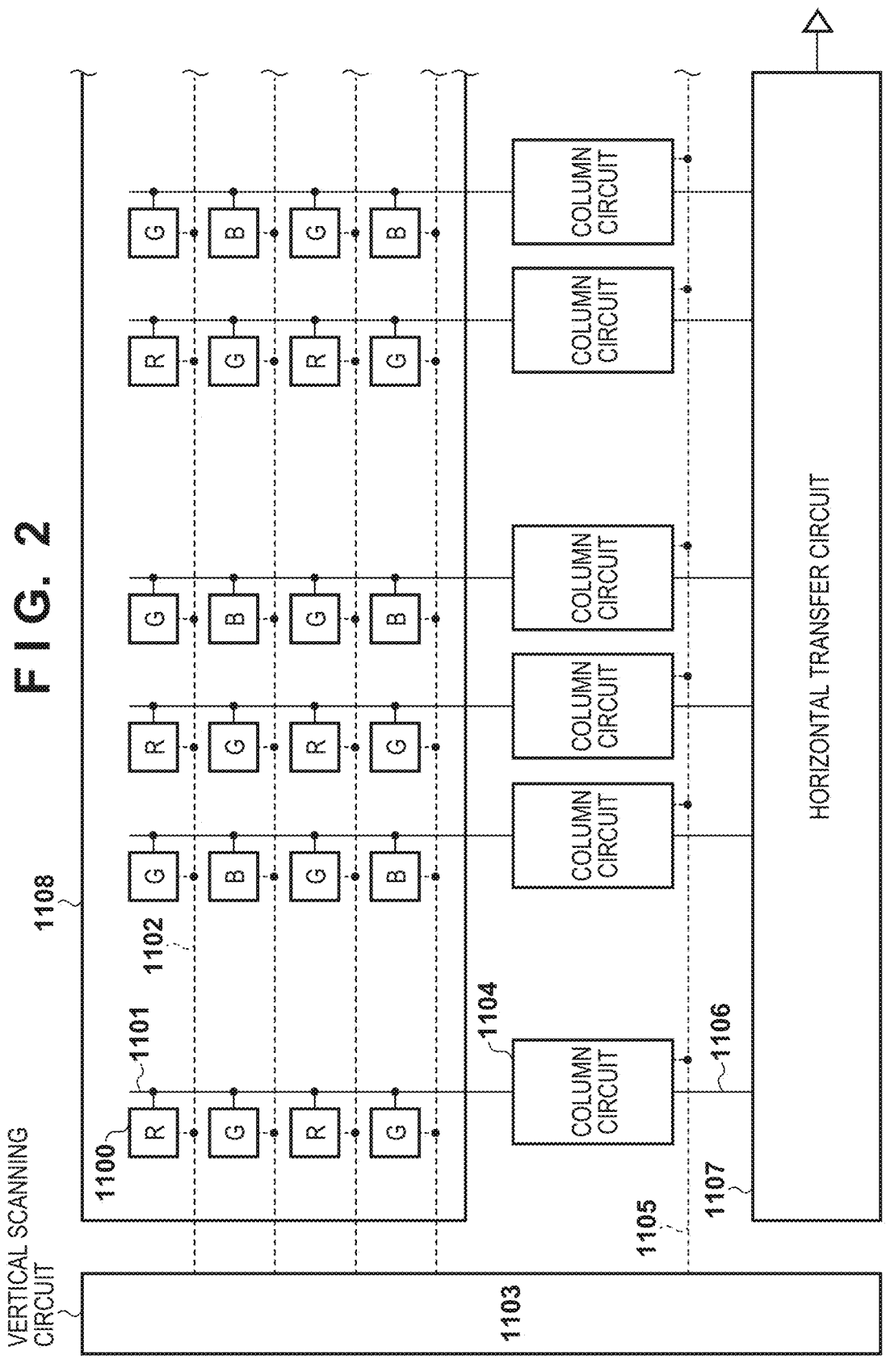
FIG. 2 is a diagram illustrating a schematic configuration of an image sensor according to the first embodiment.

FIG. 2 is a block diagram illustrating a schematic configuration of the image sensor 102 according to this embodiment, and will be described here as a CMOS image sensor.

As shown in FIG. 2, a plurality of pixels 1100 are arranged in a matrix in a pixel region 1108. In FIG. 2, in order to simplify the explanation, n+1 pixels are shown in the horizontal direction and 4 pixels are shown in the vertical direction, but in reality, a very large number of pixels are also arranged in the vertical direction. Further, each pixel 1100 is provided with one of optical color filters of a plurality of colors (in this embodiment, as an example, three colors of red, green, and blue). In FIG. 2, the pixels 1100 that are provided with red color filters and mainly receive red light are labelled with R, and the pixels 1100 that are provided with green color filters and mainly receive green light are labelled with G, and the pixels 1100 that are provided with blue color filters and mainly receive blue light are labelled with B. Each pixel 1100 having a color filter of one of the three colors is arranged according to, for example, a Bayer array.

A vertical scanning circuit 1103 sends actuation pulses to the pixels 1100 in each row through actuation signal lines 1102 commonly wired for each row. Note that although one line is representatively shown in each row as the actuation signal lines 1102 for simplifying the drawing, in reality, a plurality of actuation signal lines are wired in each row.

The pixels 1100 in the same column are connected to a common vertical output line (column output line) 1101, and a signal from each pixel is input to a column circuit 1104 common for each column via the vertical output line 1101. The column circuits 1104 are connected to the vertical scanning circuit 1103 via column circuit signal lines 1105, and perform a process of multiplying the signal from each pixel by a gain set according to an instruction from the system control unit 110. Thereby, the column circuit 1104 can perform a process of multiplying a signal from each pixel by a single gain and outputting the signal, and a process of multiplying a signal from each pixel by a plurality of different gains and outputting the signals. Furthermore, the column circuit 1104 performs A/D conversion processing on the gain-multiplied analog signal and outputs a digital signal.

The digital signal output from the column circuits 1104 is input to a horizontal transfer circuit 1107. The horizontal transfer circuit 1107 outputs the input digital image signal to the image acquisition unit 103.

Actuation Method

In the first embodiment, a first actuation method and a second actuation method are used as methods for actuating the image capturing apparatus 100 in order to acquire a plurality of images used for dynamic range expansion processing. Then, the first actuation method and the second actuation method are switched according to the HDR shooting mode described later, and the image capturing apparatus 100 is actuated using either actuation method, and the obtained plural images are combined to generate an HDR image.

First Actuation Method

First, the first actuation method will be explained. Here, a case will be described in which the image sensor 102 consecutively performs shooting three times (multiple times) to obtain three images with mutually different dynamic ranges.

The system control unit 110 controls the aperture of the imaging lens 101 via the lens control unit 112 and the vertical scanning circuit 1103 of the image sensor 102 via the image sensor control unit 111. In the first image acquisition, the aperture of the imaging lens 101 and/or the charge accumulation period of each pixel 1100 are controlled so that the brightness of the main subject will be appropriate. Further, the system control unit 110 controls the column circuit 1104 so that the pixel signal obtained from each pixel 1100 is multiplied by an appropriate gain.

In the second image acquisition, the aperture of the imaging lens 101 and/or the charge accumulation period of each pixel 1100 are controlled so that the brightness of the dark part of the subject is appropriate. At this time, the column circuit 1104 may apply a larger gain to the pixel signal than that for the first image. In the third image acquisition, the aperture of the imaging lens 101 and/or the charge accumulation period of each pixel 1100 are controlled so that the brightness of the bright part of the subject is appropriate. At this time, the column circuit 1104 may apply a smaller gain to the pixel signal than that for the first image.

As described above, by the system control unit 110 controlling the image sensor 102 and the imaging lens 101 via the image sensor control unit 111 and lens control unit 112, respectively, three images with mutually different dynamic ranges are obtained by three times of shootings.

Second Actuation Method

Next, the second actuation method will be explained. Here, a case will be described in which two images with mutually different dynamic ranges are obtained by multiplying two different gains to an image signal obtained by one shooting operation using the image sensor 102.

The system control unit 110 controls the aperture of the imaging lens 101 via the lens control unit 112 and the vertical scanning circuit 1103 of the image sensor 102 via the image sensor control unit 111 to acquire a pixel signal from each pixel 1100. Then, the system control unit 110 controls the column circuit 1104 via the column circuit signal line 1105 so as to multiply the acquired pixel signal by an appropriate gain, and the first image is output. Next, the system control unit 110 controls the column circuit 1104 via the column circuit signal line 1105 so as to multiply the same pixel signal by a gain different from that for the first image, and the second image is output. In this way, by passing one pixel signal through the column circuit 1104 twice with different gains applied to it, two images with different dynamic ranges can be obtained.

Note that in the above example, three times of shooting are taken or two different gains are used, but the present invention is not limited to three times of shooting and two different gains. For example, four or more images with mutually different dynamic ranges may be acquired by performing four or more consecutive shots, and three or more images with mutually different dynamic ranges may be acquired by applying three or more different gains to the image signal obtained by one shot.

Furthermore, in the first and second actuation methods described above, the number of pixels of each image obtained is the same as that in normal shooting, so they are advantageous in terms of image quality. On the other hand, since the column circuit 1104 and the horizontal transfer circuit 1107 are actuated for a longer time than in normal shooting, the readout time becomes longer and power consumption increases, resulting in lower frame rate during continuous shooting and shorter recording period during moving image shooting. In view of the above, in the second actuation method, the following actuation may be considered.

That is, the system control unit 110 controls the vertical scanning circuit 1103 to control the charge accumulation period so that the brightness of the main subject is appropriate for the pixels 1100 in even-numbered rows, and also controls the column circuits 1104 so that the pixel signals are multiplied by an appropriate gain. Furthermore, for the pixels 1100 in odd-numbered rows, the charge accumulation period is controlled so that the dark part of the subject becomes brighter, and the column circuits 1104 are controlled so that the pixel signals are multiplied by a gain different from that for the even-numbered rows. As described above, the system control unit 110 instructs setting to control the image sensor 102 and the imaging lens 101 via the image sensor control unit 111 and lens control unit 112, two images having mutually different dynamic ranges can be output by performing one shooting operation.

By actuating the image sensor 102 in this way, the number of pixels in the vertical direction of the resulting image will be halved, but it is possible to shoot with the same readout period as normal shooting, so, for example, influence to the frame rate during continuous shooting and moving image shooting can be reduced. Further, the number of pixels may be restored by interpolating pixels from two images through image processing.

HDR Shooting Mode Setting Processing

Next, the HDR shooting mode setting processing performed by the system control unit 110 of the image capturing apparatus 100 according to the first embodiment will be described with reference to FIGS. 3 and 4.

Figure 3:
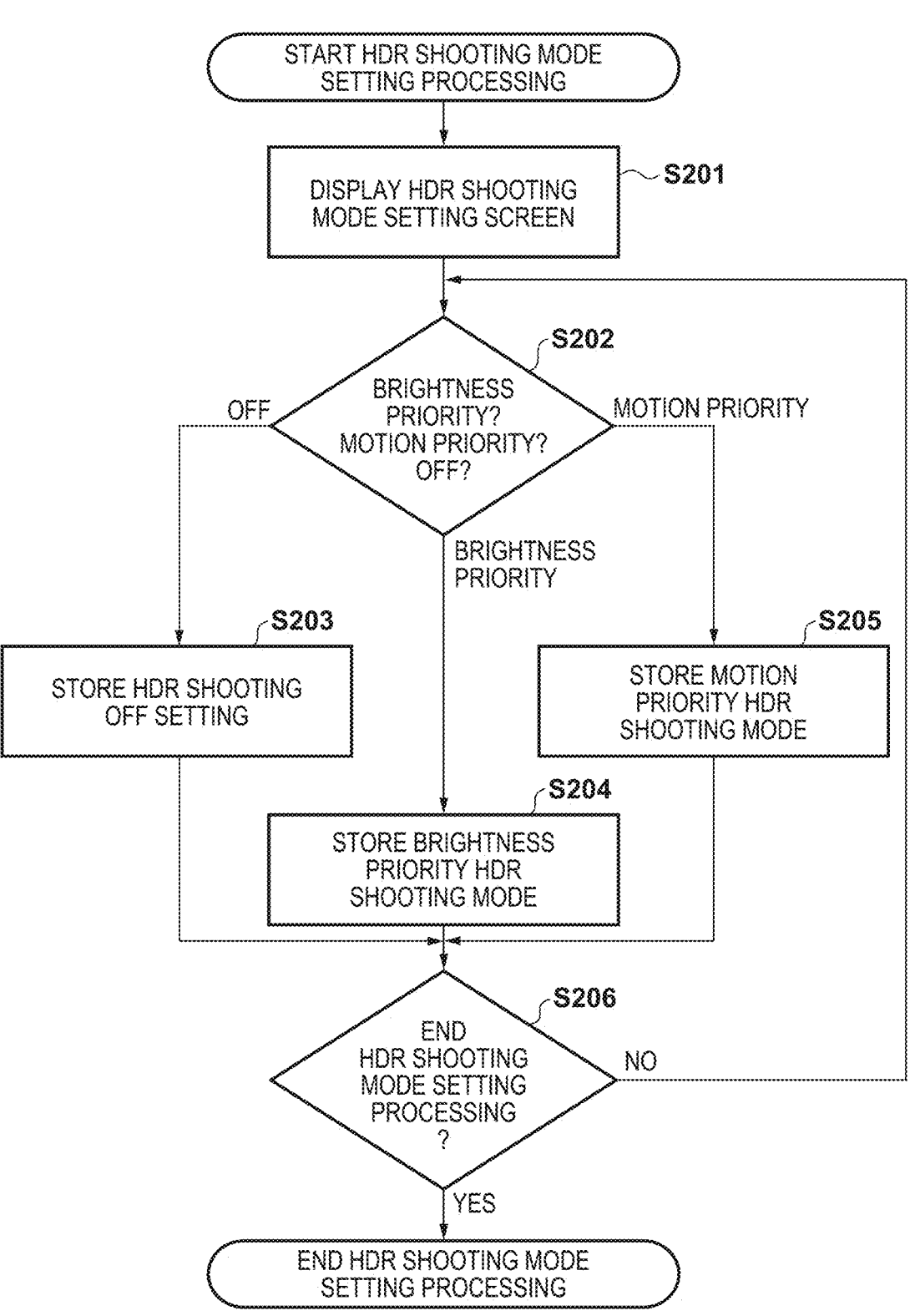
FIG. 3 is a flowchart of HDR shooting mode setting processing according to the first embodiment.

FIG. 3 is a flowchart of the HDR shooting mode setting processing performed in response to the user's operation of the operation unit 107 according to the content displayed on the display unit 109, and FIG. 4 shows the display content displayed on the display unit 109 at that time. Note that this processing is started when the HDR shooting mode setting processing is instructed through a menu button or touch panel (not shown) included in the operation unit 107.

First, in the flowchart of FIG. 3, when the user starts setting the HDR shooting mode, in step S201, the system control unit 110 displays a user interface (UI) 300 shown in FIG. 4 on the display unit 109. The UI 300 shows a setting screen for the HDR shooting mode displayed on the display unit 109, and option 301 (brightness priority) shows a mode that gives priority to the brightness of the subject to widen the dynamic range in HDR shooting. Option 302 (motion priority) is a mode that is effective when the motion of the subject is large or fast, and option 303 (OFF) indicates a setting when not performing HDR shooting. An arrow 304 indicates the currently selected setting. Furthermore, Memo 305 indicates the characteristics of the currently selected mode.

In step S202, the user selects a desired option from among the options 301 to 303 by operating the operation unit 107 and moving the arrow 304 displayed on the UI 300. If the user selects the option 303 (OFF), then the process advances to step S203, and the system control unit 110 stores the HDR shooting OFF setting in the storage unit 108. Further, if the user selects the option 301 (brightness priority), then the process advances to step S204, and the system control unit 110 stores the brightness priority HDR shooting mode in the storage unit 108. If the user selects the option 302 (motion priority), the process advances to step S205, and the system control unit 110 stores the motion priority HDR shooting mode in the storage unit 108.

In step S206, if the user does not instruct to end the HDR shooting mode setting processing, the process returns to step S202 and continues the HDR shooting mode setting processing. If the user instructs to end the HDR shooting mode setting processing, the processing ends with the selected HDR shooting mode stored in the storage unit 108.

HDR Shooting Processing

Next, processing during HDR shooting in the system control unit 110 of the image capturing apparatus 100 according to the first embodiment will be described with reference to FIG. 5.

FIG. 5 is a flowchart of HDR shooting processing performed based on the HDR shooting mode stored in the storage unit 108. Note that this processing is started when HDR shooting is instructed using a release button or touch panel (not shown) included in the operation unit 107. Further, if the processing has gone through step S203 in FIG. 3 described above, that is, if the HDR shooting OFF setting is selected, this processing is not performed.

When the HDR shooting starts, the system control unit 110 reads the HDR shooting mode stored in the storage unit 108 in step S401.

In step S402, the system control unit 110 checks the HDR shooting mode read out from the storage unit 108 in step S401, and if it is the brightness priority HDR shooting mode, the process proceeds to step S403, and if it is the motion priority HDR shooting mode, the process proceeds to step S404.

In step S403, the system control unit 110 instructs the image sensor control unit 111 and the lens control unit 112 to perform shooting using the actuation method linked to the brightness priority HDR shooting mode. Specifically, the system control unit 110 instructs setting for using the first actuation method to actuate the imaging lens 101 and the image sensor 102, performing three consecutive shootings, and outputting three images with different dynamic ranges.

On the other hand, in step S404, the system control unit 110 instructs the image sensor control unit 111 and the lens control unit 112 to shoot using the actuation method linked to the motion priority HDR shooting mode. Specifically, the system control unit 110 instructs the setting to use the first actuation method to actuate the imaging lens 101 and the image sensor 102, causing three consecutive shootings, and outputting three images with mutually different dynamic ranges.

In step S405, the image sensor control unit 111 and the lens control unit 112 control the imaging lens 101 and the image sensor 102 according to the setting instructed in step S403 or S404, and output the obtained image signals to the image acquisition unit 103.

In step S406, the image synthesis unit 104 generates an HDR image by performing known synthesis processing using the image signals temporarily held in the image acquisition unit 103 in step S405, and ends the HDR shooting.

As described above, according to the first embodiment, by adaptively changing the image shooting method for HDR expansion according to the brightness difference and the amount of motion of the subject, even if the brightness difference and the amount of motion of the subject are large, it is possible to generate a high-quality image with a wide dynamic range.

Second Embodiment

Next, a second embodiment of the present invention will be described.

In the first embodiment described above, an example is described in which the user sets the HDR shooting mode in advance and shooting is performed according to the set HDR shooting mode. However, there may be situations in which it is difficult for the user to select an appropriate HDR shooting mode. Accordingly, in the second embodiment, an example in which an automatic setting (Auto) is added to the HDR shooting mode options, so that the system control unit 110 of the image capturing apparatus 100 automatically selects an appropriate HDR shooting mode depending on the subject to be shot by the user will be explained.

Configuration of Image Capturing Apparatus

Figure 6:
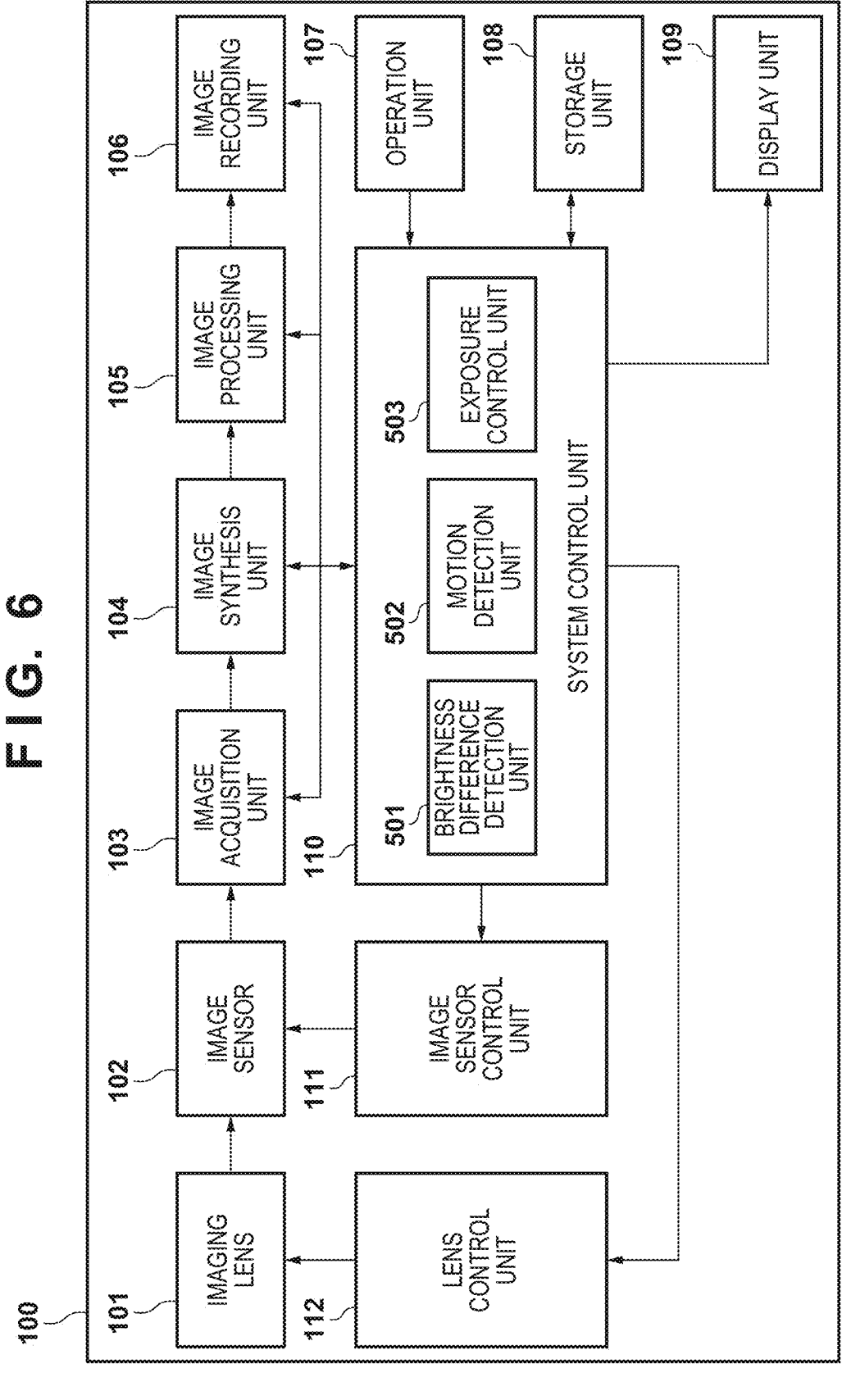
FIG. 6 is a block diagram illustrating a schematic configuration of an image capturing apparatus according to a second embodiment.

FIG. 6 is a block diagram showing a schematic configuration of the image capturing apparatus 100 according to the second embodiment. Note that components similar to those shown in FIG. 1 are given the same reference numerals, and the description thereof will be omitted.

The system control unit 110 in this embodiment includes a brightness difference detection unit 501, a motion detection unit 502, and an exposure control unit 503.

The brightness difference detection unit 501 uses an image signal temporarily stored in the image acquisition unit 103 to calculate the brightness difference between bright and dark parts of subjects. For example, the entire screen is divided into a plurality of areas, the brightness of each area is measured, and the brightness difference of the subjects is calculated from the bright and dark areas.

The motion detection unit 502 detects an amount of movement of a subject using the image signal temporarily stored in the image acquisition unit 103 and an image signal shot before the stored image signal.

The exposure control unit 503 uses the image signal temporarily stored in the image acquisition unit 103 to calculate exposure conditions at the time of shooting.

In a case where the automatic selection mode (Auto) is selected in the HDR shooting mode setting according to the judgment described later, the system control unit 110 determines the HDR shooting mode and the shooting conditions for HDR shooting based on at least one of the brightness difference of the subjects obtained from the brightness difference detection unit 501, the amount of motion of the subject obtained by the motion detection unit 502, and the exposure conditions calculated by the exposure control unit 503.

HDR Shooting Mode Setting Processing

Next, HDR shooting mode setting processing according to the second embodiment performed by the system control unit 110 of the image capturing apparatus 100 will be described with reference to FIGS. 7 to 10B.

FIG. 7 shows a flowchart of the HDR shooting mode setting processing that is performed in response to the user's operation of the operation unit 107 according to the content displayed on the display unit 109, and FIG. 8 shows display content displayed on the display unit 109 at that time. Note that this processing is started when the HDR shooting mode setting processing is instructed using a menu button or touch panel (not shown) included in the operation unit 107.

First, in the flowchart of FIG. 7, when the user starts setting the HDR shooting mode, in step S601, the system control unit 110 displays a UI 800 shown in FIG. 8 on the display unit 109. Note that in FIG. 8, components similar to those shown in FIG. 4 are given the same reference numerals, and explanation thereof will be omitted.

Option 701 (Auto) indicates a setting to automatically select an HDR shooting mode suitable for the subject to be shot. Specifically, either brightness priority indicated by the option 301, motion priority indicated by the option 302, or hybrid described later is automatically determined and set.

Options 703 to 705 indicate the expansion width of the dynamic range in HDR shooting using the number of exposure value steps, and option 702 indicates a setting in which the system control unit 110 automatically determines the expansion width of the dynamic range according to the detection result. The option 703 indicates a setting to expand the dynamic range by one exposure value step in each of the positive and negative directions. Similarly, the option 704 indicates a setting to expand the dynamic range by two exposure value steps in the positive direction and negative direction, and the option 705 indicates a setting to expand the dynamic range by three exposure value steps in the positive direction and negative direction. An arrow 706 indicates the currently selected setting of dynamic range. Further, in Memo 305, the characteristics of the currently selected setting is shown.

In step S602, the user selects the HDR shooting mode from the options 301 to 303 and 701 by operating the operation unit 107 to move the arrow 304 displayed on the UI 800. When the user selects the option 303 (OFF), the process advances to step S606, and the system control unit 110 stores the HDR shooting OFF setting in the storage unit 108. If the user selects an option other than the option 303, the process advances to step S603.

In step S603, the option selected by the user is determined, and if the user selects the option 701 (Auto), the process proceeds to step S609, and the system control unit 110 perform to automatic HDR shooting mode setting processing. Note that details of the automatic HDR shooting mode setting processing will be described later with reference to FIGS. 9 to 10B.

Furthermore, if the user selects the option 301 (brightness priority), the process advances to step S604, where the user further operates the operation unit 107 to select the desired dynamic range expansion width from among the options 702 to 705 by moving the arrow 706 displayed on the UI 300. In subsequent step S607, the system control unit 110 stores in the storage unit 108 the brightness priority HDR shooting mode selected by the user in step S603 and the exposure value step number setting selected by the user in step S604.

FIG. 8 shows, as an example, a state in which the user has selected the option 301 and the option 703. In this case, in step S607, the brightness priority HDR shooting mode and the exposure value step setting are stored in the storage unit 108, wherein the exposure value step setting causes to perform three consecutive shootings to obtain total three images comprising an image with an exposure appropriate for the main subject, an image with an exposure one step brighter than the appropriate exposure, and an image with an exposure one step darker than the appropriate exposure.

On the other hand, if the user selects the option 302 (movement priority), the process advances to step S605, where the user further operates the operation unit 107 to select the desired the dynamic range expansion width from among the options 702 to 705 by moving the arrow 706 displayed on the UI 800. In subsequent step S608, the system control unit 110 stores in the storage unit 108 the motion priority HDR shooting mode selected by the user in step S603 and the exposure value step number setting selected by the user in step S605.

If the user does not instruct to end the HDR shooting mode setting processing in step S610, the process returns to step S602 and the HDR shooting mode setting processing is continued. If the user instructs to end the HDR shooting mode setting processing, the processing ends with the selected HDR shooting mode and the exposure value step number stored in the storage unit 108.

Next, the automatic HDR shooting mode setting processing performed in step S609 of FIG. 7 will be described with reference to FIGS. 9, 10A, and 10B.

FIG. 9 is a flowchart of the automatic HDR shooting mode setting processing. It shows processing in which selection of the HDR shooting mode is automatically performed based on at least one of the brightness difference of the subjects obtained from the brightness difference detection unit 501, the amount of motion of the subject obtained from the motion detection unit 502, and the exposure conditions calculated by the exposure control unit 503. FIGS. 10A and 10B show HDR shooting mode tables that define HDR shooting modes according to the brightness difference of the subjects, the amount of motion of the subject, and the exposure conditions. Hereinafter, the brightness difference of the subject, the amount of movement of the subject, and the exposure conditions will be collectively referred to as "evaluation values."

When the automatic HDR shooting mode setting processing starts, in step S801, the system control unit 110 performs pre-shooting to detect the state of the subject, and temporarily stores the signal output from the image sensor 102 in the image acquisition unit 103. The system control unit 110 reads out images temporarily stored in the image acquisition unit 103 and calculates the evaluation values used for selecting an HDR shooting mode.

In step S802, the system control unit 110 retrieves the HDR shooting mode according to the evaluation values calculated in step S801 from the HDR shooting mode table shown in FIG. 10A or 10B. Note that the HDR shooting mode tables in FIGS. 10A and 10B and the contents of the HDR shooting mode will be described later in detail.

In step S803, the system control unit 110 stores the HDR shooting mode selected in step S802 in the storage unit 108.

In step S804, the system control unit 110 determines whether to continue the automatic HDR shooting mode setting processing. For example, if HDR shooting is instructed by a release button (not shown) included in the operation unit 107, or if the release button is no longer pressed, the automatic HDR shooting mode setting processing is terminated, and if not, the process returns to step S801 and the processes described above are repeated.

Next, the HDR shooting mode table shown in FIGS. 10A and 10B referred to in step S802 will be explained.

In FIGS. 10A and 10B, a column 901 shows the setting number assigned to each HDR shooting mode, and a group of columns 902 shows the selection conditions of the brightness difference, amount of motion and brightness, which are the conditions of the subject and correspond to the evaluation values. A column 903 shows the brightness priority HDR shooting mode, the motion priority HDR shooting mode, and the hybrid HDR shooting mode as types of HDR shooting modes.

As in the first embodiment, HDR images are captured using the first actuation method in the brightness priority HDR shooting mode, and using the second actuation method in the motion priority HDR shooting mode. Furthermore, in the hybrid HDR shooting mode, shooting is performed using a third actuation method that is intermediate between the first actuation method and the second actuation method. For example, shooting is performed twice, wherein in the first shooting, an image signal is multiplied by one gain to output one image, and in the second shooting, an image signal is multiplied by two different gains to output two images with the mutually different dynamic ranges.

Further, a group of columns 905 in FIG. 10A shows a combination of shooting sensitivity, exposure period, and number of images to be shot, and a group of columns 906 in FIG. 10B shows a combination of shooting sensitivity, aperture value, and number of images to be shot.

As shown in FIGS. 10A and 10B, the settings with the setting numbers A1, A2, D1, D2, G1, and G2 indicate the motion priority HDR shooting mode which is selected in a case where the amount of motion of the subject exceeds a predetermined range (large). In other words, these HDR shooting modes are selected in a case where the amount of motion of the subject is large and a composite image generated from images obtained through a plurality of shootings will look unnatural. Further, the gain value to be used differs depending on the brightness difference and brightness. With these settings, it is possible to perform shooting while maintaining substantially the same dynamic range as that achieved in the brightness priority HDR shooting mode even for a moving subject that would be difficult to be handled in the brightness priority HDR shooting mode.

Similarly, settings with the setting numbers C1, C2, F1, F2, I1, and I2 indicate the brightness priority HDR shooting mode which is selected in a case where the amount of motion of the subject is below a predetermined range (small). In other words, these HDR shooting modes are selected in a case where the amount of motion of the subject is small and it will not look unnatural even if a composite image is generated from images obtained through a plurality of shootings. Also, the gain value to be used is changed depending on the brightness.

Settings with the setting numbers B1, B2, E1, E2, H1, and H2 indicate the hybrid HDR shooting mode which is selected in a case where the amount of motion of the subject is within a predetermined range (medium). Within the predetermined range indicates a range of an amount of motion of the subject in which, for example, if three images are taken as shown in setting number C1, an unnatural composite image will result, but if two images are taken, the composite image will not be unnatural. Further, the gain value to be used differs depending on the brightness difference.

Here, as an example, the setting contents of the hybrid HDR shooting mode of the setting number B1 will be explained.

First, the number of shootings to be performed is two, and in the first shooting, the obtained image signal is multiplied by a gain equivalent to ISO 800 so that the brightness of the main subject is appropriate. Subsequently, in the second shooting, gains equivalent to ISO 100 and ISO 6400, which are different from the gain used in the first shooting, are applied. As a result, three image signals of ISO 800, ISO 100, and ISO 6400 are obtained as image signals to be used for generating an HDR image through the synthesis processing in the image synthesis unit 104.

HDR Shooting Processing

Next, processing during the HDR shooting in the system control unit 110 of the image capturing apparatus 100 according to the second embodiment will be described with reference to FIG. 11.

FIG. 11 is a flowchart of the HDR shooting processing performed based on the HDR shooting mode stored in the storage unit 108. Note that this processing is started when HDR shooting is instructed using a release button or touch panel (not shown) included in the operation unit 107. Further, the same step numbers are given to processes similar to those described with reference to FIG. 5 in the first embodiment, and the description thereof will be omitted as appropriate. Further, if the processing has gone through step S606 in FIG. 7 described above, that is, if the HDR shooting OFF setting is selected, this processing is not performed.

When the HDR shooting starts, the system control unit 110 reads the HDR shooting mode stored in the storage unit 108 in step S1101.

In step S1102, the system control unit 110 checks the HDR shooting mode read out from the storage unit 108 in step S1101. Then, if it is the brightness priority HDR shooting mode, the process proceeds to step S1103, if it is the motion priority HDR shooting mode, the process proceeds to step S1104, and if it is the hybrid HDR shooting mode, the process proceeds to step S1107.

The shooting operation in step S1103 is basically the same as the shooting operation performed in step S403 in FIG. 5 (that is, shooting is performed with the first actuation method), but in the second embodiment, the dynamic range expansion width is set. Therefore, the imaging lens 101 and image sensor 102 are controlled according to this setting. Furthermore, if the brightness priority HDR shooting mode is selected through the automatic HDR shooting mode setting processing, the imaging lens 101 and image sensor 102 are controlled using the combination of ISO sensitivity, exposure period, and exposure value corresponding to FIG. 10A or 10B.

Furthermore, the shooting operation performed in step S1104 is basically the same as the shooting operation performed in step S404 in FIG. 5 (that is, shooting is performed with the second actuation method), but in the second embodiment, the dynamic range expansion width is set. Therefore, the imaging lens 101 and image sensor 102 are controlled according to this setting. Furthermore, if the motion priority HDR shooting mode is selected through the automatic HDR shooting mode setting processing, the imaging lens 101 and image sensor 102 are set using the combination of ISO sensitivity, exposure period, and exposure value corresponding to FIG. 10A or 10B.

Further, in step S1107, the system control unit 110 instructs the image sensor control unit 111 and the lens control unit 112 to shoot with the actuation method linked to the hybrid HDR shooting mode. Specifically, setting is instructed in which the imaging lens 101 and the image sensor 102 are actuated with the third actuation method, whereby two consecutive shootings are performed, different gains are applied to the image signal obtained in the second shooting, three images with mutually different dynamic ranges are output. Since the hybrid HDR shooting mode is selected through the automatic HDR shooting mode setting processing, the imaging lens 101 and the image sensor 102 are controlled using the combination of ISO sensitivity, exposure period, and exposure value according to FIG. 10A or 10B.

In step S1105, the image sensor control unit 111 and the lens control unit 112 control the image sensor 102 and the imaging lens 101 to perform HDR shooting according to the setting instructed in step S1103, S1104, or S1107, and output the image signal to the image acquisition unit 103.

In step S406, the image synthesis unit 104 generates an HDR image by performing known synthesis processing using the image signal temporarily held in the image acquisition unit 103 in step S1005, and ends the HDR shooting.

As described above, according to the second embodiment, even in situations where it is difficult for the user to select an appropriate HDR shooting mode, it is possible to generate high-quality images with a wider dynamic range even if the brightness difference between subjects and the amount of movement of a subject is large.

Note that in the above example, in a case where the user selects the automatic HDR shooting mode setting (Auto), the HDR shooting mode is automatically selected, but the present invention is not limited to this. For example, in a case where the user selects HDR shooting, the HDR shooting mode may be always selected automatically.

Third Embodiment

Next, a third embodiment of the present invention will be described.

In the third embodiment, an example will be described in which the system control unit 110 sets the HDR shooting mode during live view (LV) display in which a real-time captured image of a subject is displayed live on the display unit 109. Note that the configuration of the image capturing apparatus 100 in the third embodiment is the same as that described with reference to FIG. 6 in the second embodiment, so the description thereof will be omitted here.

HDR Setting Display on LV Display

FIG. 12 shows a display for setting the HDR shooting mode displayed on the display unit 109 of the image capturing apparatus 100 according to the third embodiment.

In FIG. 12, a UI 1200 shows an LV image displayed on the display unit 109 during HDR shooting. In the LV image, an HDR shooting mode stored in the storage unit 108 is displayed in an area 1202 along with a main subject 1201 that is the target of an HDR shooting. In the example shown in FIG. 12, "motion priority" is displayed in the area 1202, which indicates that the HDR shooting mode stored in the storage unit 108 is the motion priority HDR shooting mode. If the HDR shooting mode stored in storage unit 108 is brightness priority HDR shooting mode, "brightness priority" will be displayed in the area 1202.

With this configuration, the user can always recognize what HDR shooting mode the image capturing apparatus 100 is in during HDR shooting.

HDR Shooting Mode Suggestion Display on LV Display

Next, processing according to the third embodiment by the system control unit 110 of the image capturing apparatus 100 will be explained with reference to FIGS. 13 to 16, in which, a display suggesting an HDR shooting mode suitable for the shooting conditions is displayed on an LV display during HDR shooting and a process of changing an HDR shooting mode based on the suggestion display. Note that in FIGS. 14 to 16, the same reference numerals are given to the same components as those in FIG. 12, and the description thereof will be omitted as appropriate.

FIG. 13 shows a flowchart in which the user operates the operation unit 107 to change the HDR shooting mode according to the content displayed on the display unit 109 in the LV display during HDR shooting, and FIG. 14 shows the displayed content on the display unit 109. Note that this process is started when the HDR shooting mode suggestion process during LV display during HDR shooting is instructed through the operation unit 107.

First, in the flowchart of FIG. 13, when the process of changing the HDR shooting mode during LV display during HDR shooting is started, in step S1301, the system control unit 110 reads the current HDR shooting mode stored in the storage unit 108.

In step S1302, the system control unit 110 obtains images at a constant frame rate by controlling the imaging lens 101 and the image sensor 102 via the image sensor control unit 111 and lens control unit 112 in order to perform LV display on the display unit 109. The image acquisition unit 103 outputs the image signal input at a constant frame rate to the image synthesis unit 104, while the exposure control unit 503 performs photometry of the subject using the image signal.

In step S1303, the system control unit 110 displays the LV image of the subject and the current HDR shooting mode read out in step S1301 on the display unit 109. FIG. 14 shows an example of display content at this time. In FIG. 14, a subject 1401 is a subject image with higher brightness than the main subject 1201, that is, an image of a subject such as the sun, for example.

In step S1304, the system control unit 110 controls the brightness difference detection unit 501 to calculate the brightness difference between regions having different brightness measured in step S1302. For example, the brightness difference between the subject 1201 with normal brightness and the subject 1401 with high brightness is calculated.

In step S1305, the system control unit 110 determines whether the brightness difference calculated in step S1304 is greater than or equal to a predetermined value, and if it is greater than or equal to the predetermined value, the process proceeds to step S1306; otherwise, the process proceeds to step S1310.

In step S1306, the system control unit 110 determines whether or not the current HDR shooting mode read out from the storage unit 108 in step S1301 is the motion priority HDR shooting mode, and if it is the motion priority HDR shooting mode, the process proceeds to step S1307; otherwise, the process proceeds to step S1314.

In step S1307, the system control unit 110 displays on the display unit 109 a simple menu for changing the HDR shooting mode to the brightness priority HDR shooting mode, superimposed on the LV image. FIG. 15 is a diagram showing the display content at this time. In FIG. 15, on the UI 1200, a simple menu 1501 for changing the current HDR shooting mode displayed in an area 1202, which is the motion priority HDR shooting mode, to the brightness priority HDR shooting mode is displayed. By operating the operation unit 107 according to this simple menu 1501, the user can select whether to change to the brightness priority HDR shooting mode or to remain in the motion priority HDR shooting mode.

In step S1308, if the user selects to change to the brightness priority HDR shooting mode, the process advances to step S1309; otherwise, the process directly advances to step S1314.

In step S1309, the system control unit 110 stores the brightness priority HDR shooting mode set by the user in the storage unit 108, and proceeds the process to step S1314.

As a result, if it is determined that the motion priority HDR shooting mode is set when subjects whose brightness difference is large are being shot, the user is prompted to change the setting, it is possible to easily change to the brightness priority HDR shooting mode at the appropriate time.

On the other hand, in step S1305, if the brightness difference calculated in step S1304 is not greater than the predetermined value, the process proceeds to step S1310, and the system control unit 110 determines whether the current HDR shooting mode read out from the storage unit 108 in step S1301 is the brightness priority HDR shooting mode. If it is the brightness priority HDR shooting mode, the process advances to step S1311; otherwise, the process advances to step S1314.

In step S1311, the system control unit 110 displays on the display unit 109 a simple menu for changing the HDR shooting mode to the motion priority HDR shooting mode, superimposed on the LV image. FIG. 16 is a diagram showing the display content at this time. In FIG. 16, an area 1601 indicates that the current HDR shooting mode is the brightness priority HDR shooting mode, and on the UI 1200, a simple menu 1602 for changing the current HDR shooting mode from the brightness priority HDR shooting mode to the motion priority HDR shooting mode is displayed. By operating the operation unit 107 in accordance with this simple menu 1602, the user can select whether to change to the motion priority HDR shooting mode or to remain in the brightness priority HDR shooting mode.

In step S1312, if the user selects to change to the motion priority HDR shooting mode, the process advances to step S1313; otherwise, the process directly advances to step S1314.

In step S1313, the system control unit 110 stores the motion priority HDR shooting mode in the storage unit 108 set by the user, and the process proceeds to step S1314.

As a result, if it is determined that the brightness priority HDR shooting mode is set when a subject with large movement is being shot, the user is prompted to change the setting, allowing the motion priority HDR shooting mode to be easily set at the appropriate time.

In step S1314, if the system control unit 110 determines that photometry during LV display is completed, the HDR shooting mode suggestion process is ended, otherwise the process returns to step S1301, and suggests the optimal HDR shooting mode by performing photometry and calculating brightness difference again.

As described above, according to the third embodiment, it is possible to easily and timely set an appropriate HDR shooting mode according to the condition of the subject being shot.

According to the present invention, it is possible to adaptively generate a high-quality image with a wider dynamic range even in a case where the difference in brightness and the amount of movement of a subject is large.

Other Embodiments

Note that the present invention may be applied to a system composed of a plurality of devices, or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:
an image sensor; and
at least one processor and a memory storing instructions that, when executed by the at least one processor, causes the image capturing apparatus to:
in a case where a first shooting mode is set, control to perform shooting a plurality of times with the image sensor while changing exposure to obtain a plurality of images, and in a case where a second shooting mode different from the first shooting mode is set, control to amplify an image signal obtained by performing shooting once with the image sensor by a plurality of different gains within the image sensor to obtain a plurality of images, and in a case where a third shooting mode different from the first and second shooting modes is set, control to obtain a plurality of images by multiplying one of a plurality of image signals, obtained by performing shooting a number of times less than a number of times of the shooting performed in the first shooting mode, by a plurality of different gains.

2. The image capturing apparatus according to claim 1, wherein the at least one processor further functions as a generation unit that generates from a plurality of images a single image having a wider dynamic range than that of each of the plurality of images obtained in one of the first to third shooting modes.

3. The image capturing apparatus according to claim 1, wherein in the second shooting mode, an image signal obtained by performing the shooting once is divided into a plurality of regions, and the image signal is multiplied by a different gain for each of the plurality of regions.

4. The image capturing apparatus according to claim 1, wherein the at least one processor further functions as a setting unit that sets one of the first to third shooting modes.

5. The image capturing apparatus according to claim 4, wherein the setting unit sets the first shooting mode in a case where a dynamic range of a shot image is given priority, and sets the second shooting mode in a case where a subject moves quickly.

6. The image capturing apparatus according to claim 4, wherein the at least one processor further functions as an operating unit that inputs instructions by a user,
wherein the setting unit sets to one of the first to third shooting modes according to an operation of the operating unit.

7. The image capturing apparatus according to claim 4, wherein an expansion width of a dynamic range can be selected using the setting unit.

8. The image capturing apparatus according to claim 4, wherein the at least one processor further functions as:
a brightness difference detection unit that detects a brightness difference of a subject to be shot;
a motion detection unit that detects motion of the subject; and
a brightness detection unit that detects brightness of the subject.

9. The image capturing apparatus according to claim 8, wherein the setting unit sets to one of the first to third shooting modes according to at least one of the brightness difference, the motion, and the brightness of the subject.

10. The image capturing apparatus according to claim 8 further comprising a storage unit that stores a table in which the brightness difference, the motion, and the brightness of the subject are associated with the first to third shooting modes,
wherein the setting unit sets to one of the first to third shooting modes by referring to the table.

11. The image capturing apparatus according to claim 1, wherein the at least one processor further functions as a suggestion unit that suggests any one of the first to third shooting modes.

12. A control method of an image capturing apparatus comprising:
setting to either of a first shooting mode in which shooting is performed a plurality of times with an image sensor while changing exposure to obtain a plurality of images, or a second shooting mode different from the first shooting mode in which an image signal obtained by performing shooting once with the image sensor is amplified by a plurality of different gains within the image sensor to obtain a plurality of images, or a third shooting mode different from the first and second shooting modes in which a plurality of images are obtained by multiplying one of a plurality of image signals, obtained by performing shooting a number of times less than a number of times of the shooting performed in the first shooting mode, by a plurality of different gains.

13. A non-transitory computer-readable storage medium, the storage medium storing a program that is executable by the computer, wherein the program includes program code for causing the computer to perform a control method of an image capturing apparatus comprising:
setting to either of a first shooting mode in which shooting is performed a plurality of times with an image sensor while changing exposure to obtain a plurality of images, or a second shooting mode different from the first shooting mode in which an image signal obtained by performing shooting once with the image sensor is amplified by a plurality of different gains within the image sensor to obtain a plurality of images, or a third shooting mode different from the first and second shooting modes in which a plurality of images are obtained by multiplying one of a plurality of image signals, obtained by performing shooting a number of times less than a number of times of the shooting performed in the first shooting mode, by a plurality of different gains.

* * * * *